United States Patent [19]
Suh et al.

[11] 3,904,680

[45] *Sept. 9, 1975

[54] L-3-HYDROXYMETHYLTYROSINE AND SALTS THEREOF

[75] Inventors: John T. Suh, Mequon; Richard A. Schnettler, Brown Deer, both of Wis.

[73] Assignee: Colgate-Palmolive Company, New York, N.Y.

[ * ] Notice: The portion of the term of this patent subsequent to July 23, 1991, has been disclaimed.

[22] Filed: Dec. 22, 1972

[21] Appl. No.: 317,800

[52] U.S. Cl. ............ 260/519; 252/189; 260/471 A; 260/501.11; 424/309
[51] Int. Cl.² .................................... C07C 101/08
[58] Field of Search .................................... 260/519

[56] References Cited
UNITED STATES PATENTS
3,592,844   7/1971   Reinhold et al. .................... 260/519

OTHER PUBLICATIONS

Gilman, Organic Chemistry, Vol. I, 2nd ed., (1958), pp. 803–805.

Dauben et al., Journal of the American Society, Vol. 70, (1948), pp. 1759–1762.

Chemical Abstracts, Vol. 42, 131b.

Primary Examiner—James A. Patten
Assistant Examiner—L. A. Thaxton
Attorney, Agent, or Firm—T. F. Kryshak; M. L. Youngs

[57] ABSTRACT

The compound L-3-hydroxymethyltyrosine is a chelating agent for heavy metal ions and possesses antihypertensive activity. A process is disclosed for making optically pure L-3-hydroxymethyltyrosine.

2 Claims, No Drawings

L-3-HYDROXYMETHYLTYROSINE AND SALTS THEREOF

RELATED CASE

In our co-pending application, U.S. Ser. No. 229,558, filed Feb. 25, 1972, now U.S. Pat. No. 3,825,590 the DL form of 3-hydroxymethyltyrosine is disclosed.

BACKGROUND OF THE INVENTION

The compound 3-formyltyrosine is disclosed in German Offenlegungsschrift No. 2,122,485.

SUMMARY OF THE INVENTION

The compound L-3-hydroxymethyltyrosine may be represented by the following formula

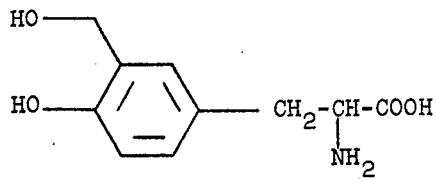

The preferred method of preparing L-3-hydroxymethyltyrosine comprises heating an aqueous mixture of L-tyrosine to about 90° C., adding acetic anhydride to the mixture with stirring, and then concentrating the mixture to dryness. The resulting amide is dissolved in aqueous sodium hydroxide and dimethyl sulfate is added to form L-O-methyl-N-acetyltyrosine which is dissolved in an ethyalcohol-chloroform solution, treated with p-toluenesulfonic acid and heated at reflux to form the corresponding ethyl ester. The ethyl ester is then dissolved in methylene chloride, titanium tetrachloride and the solution chilled. To the chilled solution is added $\alpha,\alpha$-dichloromethyl methyl ether to form L-4-methoxy-3-formyl-N-acetyltyrosine ethyl ester. The thus obtained ethyl ester is reacted with a solution of boron trichloride in methylene chloride to form L-3-formyl-N-acetyltyrosine ethyl ester which upon treatment with 4 N hydrochloric acid forms L-3-formyltyrosine hydrochloride. The resulting compound is then treated with potassium carbonate to form the free base 3-formyltyrosine, which is dissolved in water and hydrogenated at 40 psi of hydrogen in the presence of a platinum oxide catalyst to form L-3-hydroxymethyltyrosine.

The process may be illustrated as follows:

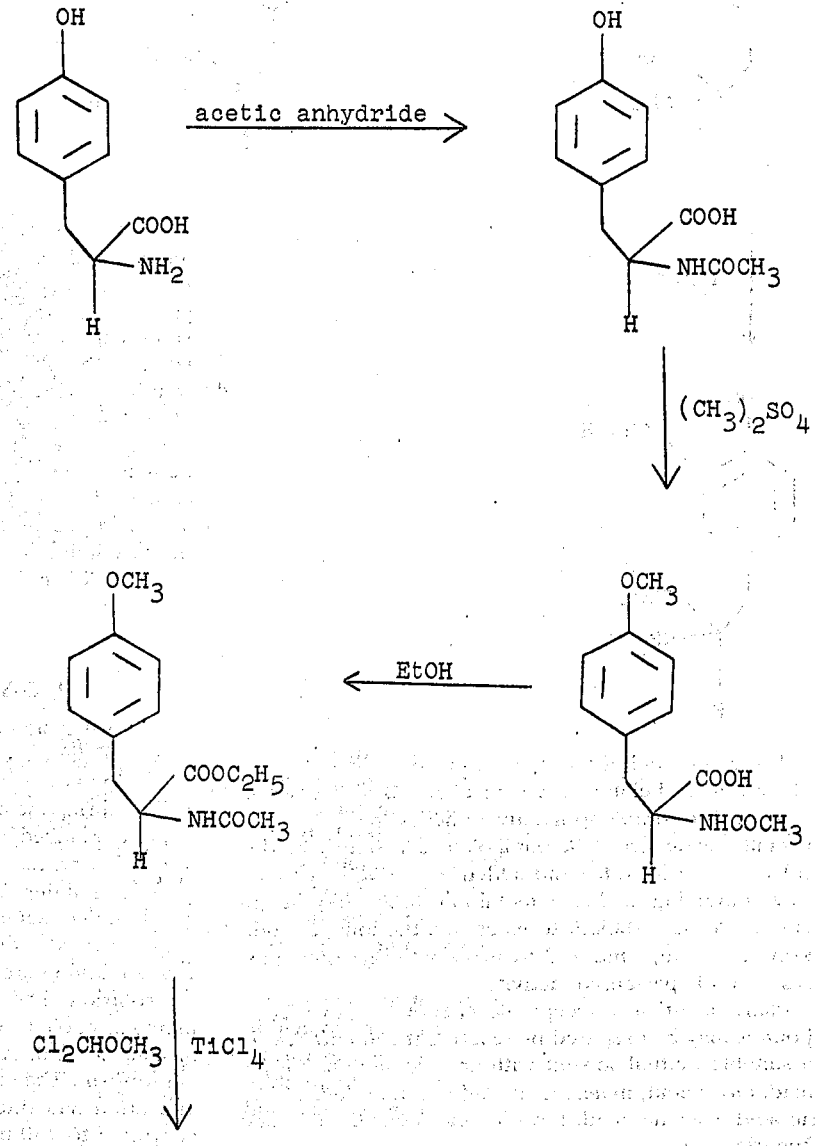

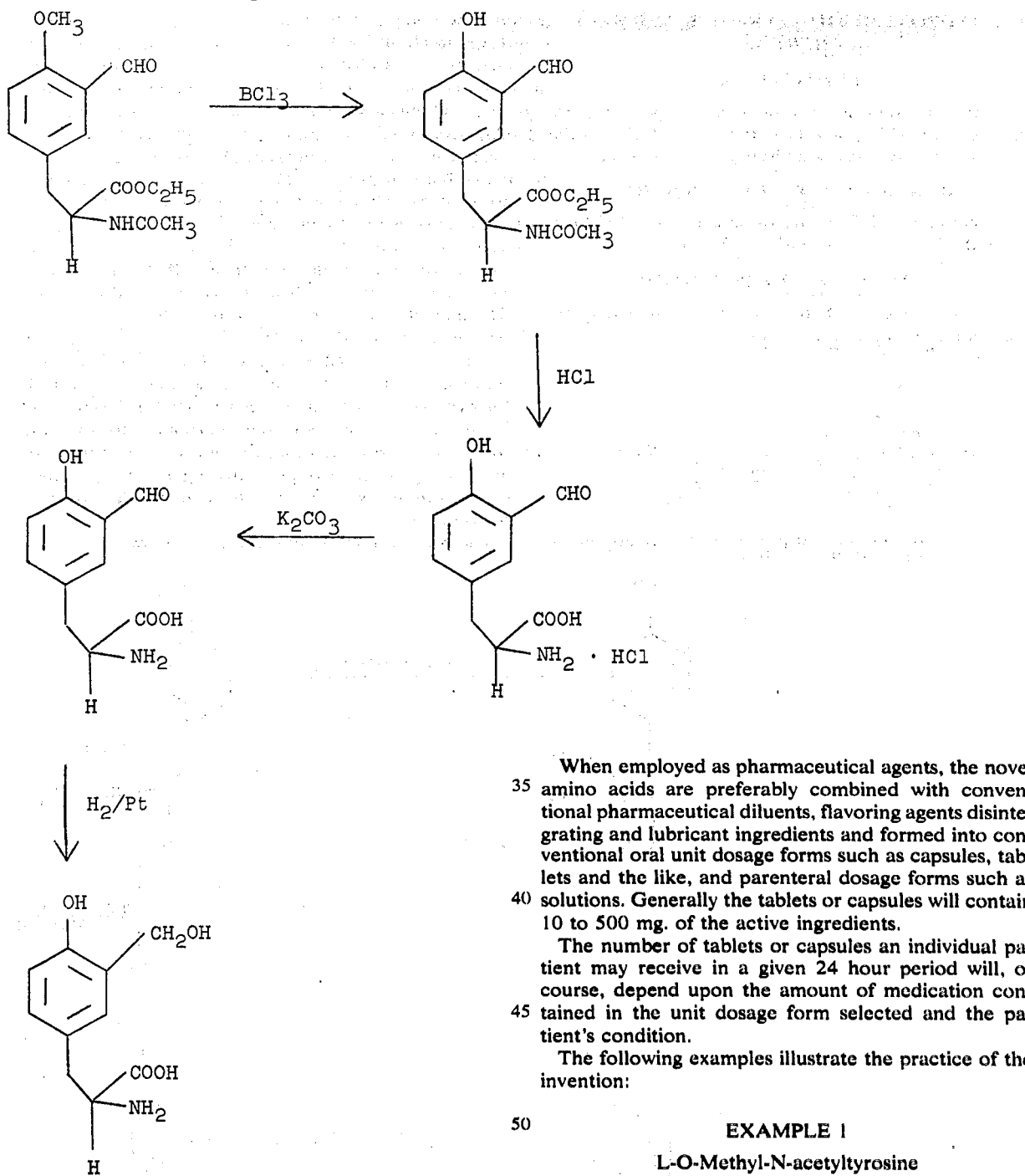

The compound of the present invention may be employed as a chelating agent in chemical processes in which it is desirable to inactivate heavy metal ions, especially ferric ions. The compound can simply be dissolved in warm water and added to the aqueous mixture containing the heavy metal ions in an amount calculated to be sufficient to inactivate the ions. In addition, the compound L-3-hydroxymethyltyrosine possesses antihypertensive activity.

Pharmaceutically acceptable salts of the novel compounds may be prepared by reacting the amino acid in a suitable mutual solvent with an acid such as formic acid, citric acid, maleic acid, sulfuric acid, hydrochloric acid, succinic acid, tartaric acid, benzoic acid and fumaric acid.

When employed as pharmaceutical agents, the novel amino acids are preferably combined with conventional pharmaceutical diluents, flavoring agents disintegrating and lubricant ingredients and formed into conventional oral unit dosage forms such as capsules, tablets and the like, and parenteral dosage forms such as solutions. Generally the tablets or capsules will contain 10 to 500 mg. of the active ingredients.

The number of tablets or capsules an individual patient may receive in a given 24 hour period will, of course, depend upon the amount of medication contained in the unit dosage form selected and the patient's condition.

The following examples illustrate the practice of the invention:

EXAMPLE 1

L-O-Methyl-N-acetyltyrosine

To a suspension of 45 g. (0.25 mole) tyrosine in 500 ml. water heated to 90°C. is added 190 ml. acetic anhydride dropwise over a 15 minute period. The heat is removed during the addition of the acetic anhydride. The solution is stirred an additional 15 minutes and concentrated to dryness. The residue is dissolved in 140 ml. water containing 30 g. sodium hydroxide. To the solution is slowly added 41 ml. dimethyl sulfate over a 30 minute period. Toward the end of the addition, 40 ml. 10% sodium hydroxide is added to maintain basicity of the solution. The solution is stirred an additional 30 minutes, cooled, and acidified with concentrated hydrochloric acid. A gum which forms is extracted with chloroform. The organic solution is washed with water and dried and filtered. The chloroform phase is concentrated to 250 ml. and refrigerated. The white solid which crystallizes has a m.p. of 142°–145° C.

EXAMPLE 2

L-O-Methyl-N-acetyltyrosine ethyl ester

A solution of 15 g. (0.063 mole) L-O-methyl-N-acetyltyrosine in 100 ml. ethanol and 400 ml. chloroform is charged with 1.0 g. p-toluenesulfonic acid and refluxed 15 hours, poured into $H_2O$, extracted with chloroform, washed with water and dried. Evaporation of solvent affords L-O-methyl-N-acetyltyrosine ethyl ester as a solid, m.p. 85°–90° C.

EXAMPLE 3

L-4-Methoxy-3-formyl-N-acetyltyrosine ethyl ester

To a chilled solution of 17.8 g. (0.067 mole) L-O-methyl-N-acetyltyrosine ethyl ester in 300 ml. methylene chloride is added dropwise 50 ml. titanium tetrachloride. A deep orange solution is obtained. To the chilled solution is added 20 ml. $\alpha,\alpha$-dichloromethyl methyl ether over a 10 minute period. The solution is allowed to warm to room temperature and is stirred for 2 hours. The mixture is poured into 200 g. ice and 200 ml. 3N HCl and extracted with methylene chloride, washed with water and dried. Evaporation of solvent gives a semi-solid which on chromatography over silica gel gives purified L-4-methoxy-3-formyl-N-acetyltyrosine ethyl ester, m.p. 85° C.

EXAMPLE 4

L-3-Formyl-N-acetyltyrosine ethyl ester

In 200 ml. cold methylene chloride is dissilved 29 g. boron trichloride to which is added 7.0 g. (0.0239 mole) L-4-methoxy-3-formyl-N-acetyltyrosine ethyl ester. The solution is stirred 15 hours at room temperature during which time a green gum is deposited on the flask. Water (1000 ml.) is added dropwise to the reaction mixture. The organic layer is separated, washed with water, and dried. Evaporation of solvent gives a pink oil which is chromatographed over silica gel to give L-3-formyl-N-acetyltyrosine ethyl ester as a crystalline solid, m.p. 116° C.

EXAMPLE 5

L-3-Formyltyrosine hydrochloride

In 20 ml. 4N hydrochloric acid is suspended 1.67 g. L-3-formyl-N-acetyltyrosine ethyl ester. The mixture is refluxed one hour and the solvent evaporated to give a pink solid which is triturated with isopropanol:ether to give L-3-formyltyrosine hydrochloride as a solid.

EXAMPLE 6

L-3-Hydroxymethyltyrosine

In 40 ml. water is dissolved 3.4204 g. (0.0139 mole) L-3-formyltyrosine hydrochloride. Potassium carbonate (0.965 g., 0.00697 mole) is added and the solution allowed to stand 15 hours. Yellow crystals of 3-formyltyrosine are obtained, collected and rinsed with 10 ml. cold water and 10 ml. isopropanol. The material is dried to give 2.28 g. (78%) yellow solid. The free amino acid is dissolved in 250 ml. water and hydrogenated over 0.3 g. platinum oxide at 40 psi hydrogen. After 1.5 hours the theoretical volume of hydrogen is absorbed. After filtering and concentrating the solvent to 20 ml., a white precipitate forms which is removed by filtration. The filtrate is allowed to evaporate to dryness and redissolved in 20 ml. water. The insoluble factor is again removed and the filtrate allowed to evaporate to dryness. Trituration with ethanol affords L-3-hydroxymethyltyrosine as a white solid which does not melt at 360°: $[\alpha]_D^{25} = -30.49°$.

Anal. Calcd. for $C_{10}H_{13}NO_4$: C, 56.86; H, 6.20; N, 6.63. Found: C, 56.93; H, 6.24; N, 6.54.

We claim:

1. A compound selected from L-3-hydroxymethyltyrosine and its pharmaceutically acceptable salts.

2. The compound of claim 1 which is L-3-hydroxymethyltyrosine.

* * * * *